July 8, 1924.

B. E. REED

BELT FASTENING DEVICE

Filed July 29, 1922

1,500,153

INVENTOR
Bessie E. Reed.
BY
M. E. Gillham
ATTORNEY

Patented July 8, 1924.

1,500,153

UNITED STATES PATENT OFFICE.

BESSIE E. REED, OF KANSAS CITY, MISSOURI.

BELT-FASTENING DEVICE.

Application filed July 29, 1922. Serial No. 578,432.

*To all whom it may concern:*

Be it known that I, BESSIE E. REED, a citizen of the United States, and residing in Kansas City, in the county of Jackson and State of Missouri, have invented a new and useful Belt-Fastening Device, of which the following is a specification.

My invention relates generally to belt fastening devices, and especially to a device of this character which is adapted for coupling the ends of belts and bands used in ladies' dresses.

The object of the invention is to provide a belt fastening device having a hook member and a hook engaging member provided with facility for engaging and disengaging each other and which may be sewed on the ends of bands and belts used in ladies' dresses providing quick and easy belt connection and having facility for accommodating the body movements of the user.

Another object of the invention is to provide the members with facility to secure a safe belt fastener.

Figure 1:
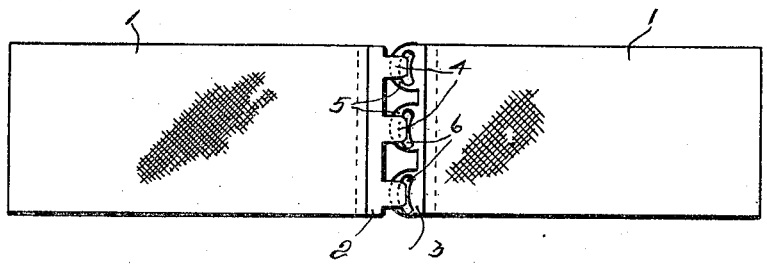
Figure 2:
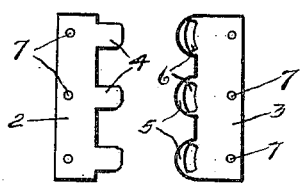
Figure 4:
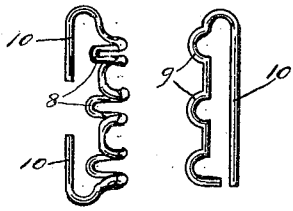
Figure 3:

I attain these objects and other advantages by means of the combination of parts and structure illustrated in the accompanying drawing in which—Figure 1, is a conventional waist band for ladies' dresses, to which my invention is applied; Figure 2, is a plan view of the hook member and the hook engaging member, shown apart from the band; Figure 3, is an end view of the members of the fastening device and, Figure 4, is a plan view of a modified form of the device.

Referring to the drawings the numeral 1, designates a cloth band used in the waist of ladies' dresses. On the ends of the band are suitably secured the hook member 2, and the hook engaging member 3, the members being shown in engagement. The hook member, likewise the hook engaging member, are preferably made of suitable metal plate, but they may be made of any other suitable material, such as wood, fiber, card-board, and the like. The hook member is provided with a plurality of fingers 4, which are bent back to form hooks, and the hook engaging member is provided with a plurality of ears 5, in each of which are curved slotted apertures forming eyes 6, which are adapted for loosely receiving the hooks on the hook member. The members 2 and 3, are perforated, as shown at 7, for facilitating the fastening of the members on the band by thread, or any other suitable means. In Figure 4, I show a modified form of the members 2 and 3, being made of pliable wire, the wire forming the hook member being bent to form hooks 8, and the wire of the hook engaging member being bent to form curved eyes 9, adapted for receiving the hooks on the hook member. Both members are bent to provide attaching portions 10, on which the ends of the band may be sewed or otherwise fastened.

The members 2 and 3, are fastened on the ends of the band and the hooks on the hook member are entered into the eyes of the hook engaging member. The curved eyes in the hook engaging member permits the hooks of the hook member to slide longitudinally of the member, thus making the coupling of the band simple and certain, regardless of wear and tear of the members, moreover, the coupled members may adjust themselves relative to each other to accommodate the body movements of the user of the band. This accommodation is not possible in the case of the usual rigid coupling used on dress bands.

Having described my invention what I claim is—

In a belt fastening device, the combination of a hook member comprising a plate having its one edge cut away to form of the cut away portions flat fingers, the end portions of the fingers being formed down and then formed back to form concealed hooks, and a hook engaging member comprising a plate having its one edge cut away to form of the cut away portions flat ears, said ears being apertured transversely on a suitable radius to form forwardly curved eyes, the concaved edge of the eyes being adapted for frictionally engaging the hooks on said hook member to thereby hold said members coupled and substantially aligned.

Kansas City, Missouri, July 24th, 1922.

BESSIE E. REED.

Witnesses:
 GOODWIN CREASON,
 DWIGHT M. SMITH.